US011601432B2

United States Patent
Pike

(10) Patent No.: US 11,601,432 B2
(45) Date of Patent: *Mar. 7, 2023

(54) ROLLING SECURITY PLATFORM

(71) Applicant: Cyemptive Technologies, Inc.

(72) Inventor: Robert Pike, Woodinville, WA (US)

(73) Assignee: Cyemptive Technologies, Inc., Snohomish, WA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/194,132

(22) Filed: Mar. 5, 2021

(65) Prior Publication Data

US 2021/0194880 A1 Jun. 24, 2021

Related U.S. Application Data

(63) Continuation of application No. 16/820,618, filed on Mar. 16, 2020, now Pat. No. 10,965,678, which is a
(Continued)

(51) Int. Cl.
*G06F 21/57* (2013.01)
*G06F 21/62* (2013.01)
(Continued)

(52) U.S. Cl.
CPC ............ *H04L 63/10* (2013.01); *G06F 9/5077* (2013.01); *G06F 21/57* (2013.01);
(Continued)

(58) Field of Classification Search
CPC ... H04L 63/10; H04L 63/0846; H04L 63/102; H04L 63/108; H04L 63/1408;
(Continued)

(56) References Cited

U.S. PATENT DOCUMENTS 7,260,640 B1  8/2007  Kramer et al.
7,757,226 B2  7/2010  Srivastava et al.
(Continued)

FOREIGN PATENT DOCUMENTS

CN  1328744 A  12/2001
CN  1780219 A  5/2006
(Continued)

OTHER PUBLICATIONS

China National Intellectual Property Administration, Second Office Action, Chinese Patent Application No. 201680006089.X, dated Apr. 30, 2020, 6 pages.
(Continued)

*Primary Examiner* — Techane Gergiso
(74) *Attorney, Agent, or Firm* — Fenwick & West LLP

(57) ABSTRACT

A method of rolling security for a system that includes multiple server groups, such as a first server group of one or more servers and a second server group of one or more servers. The method includes repeatedly initiating rebuilding of the first server group of one or more servers. The method also includes repeatedly initiating rebuilding of the second server group of one or more servers. The rebuilding of the first server group of one or more servers is staggered in time from the rebuilding of the second server group of one or more servers. The servers may be physical servers or virtual machines. Rolling security may also be applied to software containers, computing devices within a data center, and computing devices outside of a datacenter.

20 Claims, 10 Drawing Sheets

Related U.S. Application Data continuation of application No. 15/875,894, filed on Jan. 19, 2018, now Pat. No. 10,616,229, which is a continuation of application No. 14/857,775, filed on Sep. 17, 2015, now Pat. No. 9,906,530.

(60) Provisional application No. 62/105,685, filed on Jan. 20, 2015.

(51) Int. Cl.
| | |
|---|---|
| H04L 67/148 | (2022.01) |
| G06F 9/50 | (2006.01) |
| H04L 9/40 | (2022.01) |
| H04L 67/01 | (2022.01) |

(52) U.S. Cl.
CPC ...... *G06F 21/6218* (2013.01); *H04L 63/0846* (2013.01); *H04L 63/102* (2013.01); *H04L 63/108* (2013.01); *H04L 63/1408* (2013.01); *H04L 63/1416* (2013.01); *H04L 63/1425* (2013.01); *H04L 63/1441* (2013.01); *H04L 63/1466* (2013.01); *H04L 63/20* (2013.01); *H04L 67/148* (2013.01); *H04L 63/0263* (2013.01); *H04L 67/01* (2022.05)

(58) Field of Classification Search
CPC ............. H04L 63/1416; H04L 63/1425; H04L 63/1441; H04L 63/1466; H04L 63/20; H04L 67/148; H04L 67/01; H04L 63/0263; G06F 9/5077; G06F 21/57; G06F 21/6218; G06F 9/505; G06F 9/5083
See application file for complete search history.

(56) References Cited

U.S. PATENT DOCUMENTS

| | | | |
|---|---|---|---|
| 8,108,734 | B2 | 1/2012 | Andrews et al. |
| 8,510,807 | B1 | 8/2013 | Elazary et al. |
| 8,966,474 | B2 | 2/2015 | Herington |
| 9,219,705 | B2 | 12/2015 | Heinson et al. |
| 9,614,853 | B2 | 4/2017 | Pike |
| 9,740,472 | B1 | 8/2017 | Sohi et al. |
| 9,960,963 | B2 | 5/2018 | Selvaraj et al. |
| 10,341,349 | B2 | 7/2019 | Pike |
| 2001/0037399 | A1 | 11/2001 | Eylon et al. |
| 2002/0087994 | A1 | 7/2002 | Gomez |
| 2002/0188706 | A1 | 12/2002 | Richards et al. |
| 2003/0115267 | A1* | 6/2003 | Hinton ............... G06F 21/41 709/204 |
| 2003/0126202 | A1* | 7/2003 | Watt .................. G06F 9/505 707/999.01 |
| 2003/0208612 | A1 | 11/2003 | Harris et al. |
| 2004/0103337 | A1 | 5/2004 | Smith |
| 2004/0117622 | A1 | 6/2004 | Marquet et al. |
| 2004/0210582 | A1 | 10/2004 | Chatterjee et al. |
| 2004/0255189 | A1 | 12/2004 | Chu et al. |
| 2005/0188222 | A1 | 8/2005 | Motsinger et al. |
| 2005/0210461 | A1 | 9/2005 | Srivastava et al. |
| 2005/0249341 | A1 | 11/2005 | Mahone et al. |
| 2005/0257211 | A1 | 11/2005 | Chatterjee et al. |
| 2007/0106798 | A1 | 5/2007 | Masumitsu et al. |
| 2008/0046982 | A1 | 2/2008 | Parkinson |
| 2008/0104411 | A1 | 5/2008 | Agrawal et al. |
| 2008/0168531 | A1 | 7/2008 | Gavin |
| 2008/0183975 | A1 | 7/2008 | Foster et al. |
| 2008/0250419 | A1 | 10/2008 | Kasten et al. |
| 2010/0274885 | A1 | 10/2010 | Yoo et al. |
| 2010/0281102 | A1 | 11/2010 | Chinta et al. |
| 2010/0306578 | A1 | 12/2010 | Thornton et al. |
| 2011/0055921 | A1 | 3/2011 | Narayanaswamy et al. |
| 2011/0219437 | A1 | 9/2011 | Ohkado |
| 2011/0238924 | A1 | 9/2011 | Hampton et al. |
| 2011/0296245 | A1 | 12/2011 | Alberi et al. |
| 2011/0302653 | A1 | 12/2011 | Frantz et al. |
| 2012/0131204 | A1 | 5/2012 | Song |
| 2012/0184217 | A1 | 7/2012 | Jeanniot |
| 2012/0209977 | A1 | 8/2012 | Nakajo |
| 2012/0240185 | A1 | 9/2012 | Kapoor et al. |
| 2013/0111497 | A1 | 5/2013 | Chen et al. |
| 2013/0160122 | A1 | 6/2013 | Choi et al. |
| 2013/0238928 | A1 | 9/2013 | Watanabe et al. |
| 2014/0108775 | A1 | 4/2014 | Kludy et al. |
| 2015/0269044 | A1* | 9/2015 | Patel ....................... G06F 3/065 714/6.3 |
| 2016/0092308 | A1 | 3/2016 | Bates |
| 2016/0156611 | A1 | 6/2016 | Rozman |

FOREIGN PATENT DOCUMENTS

| | | |
|---|---|---|
| CN | 101232399 A | 7/2008 |
| CN | 101741832 A | 6/2010 |
| CN | 101960824 A | 1/2011 |
| CN | 103051623 A | 4/2013 |
| CN | 104133730 A | 11/2014 |
| JP | 2001249908 A | 9/2001 |
| JP | 2002/111727 A | 4/2002 |
| JP | 2006526843 A | 11/2006 |
| JP | 2007/116405 A | 5/2007 |
| JP | 2007172093 A | 7/2007 |
| JP | 2009/232111 A | 10/2009 |
| JP | 2010244515 A | 10/2010 |
| JP | 2010277143 A | 12/2010 |
| JP | 2013008322 A | 1/2013 |
| KR | 10-0640004 B1 | 11/2006 |
| WO | WO 2016118517 A1 | 7/2016 |

OTHER PUBLICATIONS

European Extended Search Report, European Application No. 16740600.8, dated Oct. 16, 2018, 4 pages.

National Intellectual Property Administration, Office Action, Chinese Patent Application No. 201680006089.X, dated Nov. 4, 2019, 18 pages.

National Intellectual Property Administration, Office Action, Chinese Patent Application No. 201680006399.1, dated Nov. 29, 2019, 26 pages.

Neamtiu, I. et al., "Cloud Software Upgrades: Challenges and Opportunities," 2011 International Workshop on the Maintenance and Evolution of Service-Oriented and Cloud-Based Systems (MESOCA), IEEE, Sep. 26, 2011, pp. 1-10.

Openstack. "Upgrade-with-minimal-downtime," Sep. 28, 2011, 9 pages, [Online] [Retrieved on Oct. 5, 2018] Retrieved from the Internet<URL:https://wiki.openstack.orq/wiki/Upqrade-with-minimal-down-time>.

PCT International Search Report and Written Opinion, PCT Application No. PCT/US16/13942, dated Apr. 19, 2016, 14 pages.

PCT International Search Report and Written Opinion, PCT Application No. PCT/US16/13944, dated Mar. 28, 2016, 15 pages.

United States Office Action, U.S. Appl. No. 14/857,775, dated Dec. 1, 2016, 16 pages.

United States Office Action, U.S. Appl. No. 14/857,775, dated Jun. 14, 2017, 16 pages.

United States Office Action, U.S. Appl. No. 15/875,894, dated May 29, 2019, 17 pages.

United States Office Action, U.S. Appl. No. 15/875,894, dated Sep. 21, 2018, 21 pages.

United States Office Action, U.S. Appl. No. 16/416,946, dated Oct. 30, 2020, 12 pages.

European Patent Office, Extended European Search Report, European Patent Application No. 16740599.2, dated Jul. 30, 2018, eight pages.

United States Office Action, U.S. Appl. No. 16/416,946, dated Apr. 22, 2021, 15 pages.

* cited by examiner

ROLLING SECURITY PLATFORM

CROSS REFERENCE TO RELATED APPLICATIONS

This application is a continuation of U.S. application Ser. No. 16/820,618, filed Mar. 16, 2020, which is a continuation of U.S. application Ser. No. 15/875,894, filed Jan. 19, 2018, which is a continuation of U.S. application Ser. No. 14/857,775, filed Sep. 17, 2015, which claims priority from U.S. Provisional Patent Application No. 62/105,685, filed on Jan. 20, 2015, the contents of which are incorporated by reference in its entirety.

BACKGROUND

1. Field

The present disclosure relates to computer security against unauthorized access to resources, and more specifically to a rolling security platform for increased security.

2. Description of Related Art

In network communications there are many forms of software and hardware security, including firewalls and intrusion detection and prevention systems. But they all fault on one core issue, that if rules are not applied correctly they can open opportunities for unauthorized access. Operating systems and applications today also have many bugs which if exposed to the internet, can enable remote access to servers hosting the applications.

SUMMARY

Embodiments of the present disclosure include intelligent methods and systems of providing online security against hackers. In one embodiment, disclosed is a system for rolling security. The system comprises a first server group of servers and a second server group of servers. Each server in the first server group and second server group includes software that includes an operating system and application that supports user sessions. A non-transitory computer readable medium stores instructions that, when executed by at least one processor cause the at least one processor to access rolling timing information indicating rebuild timings for the first server group and rebuild timings for the second server group. The rebuild timings for the first server group are staggered in time from the rebuild timings of the second server group. The instructions also cause the processor to periodically initiate rebuilding of the software of each server of the first server group of servers according to the rebuild timings for the first server group. The instructions also cause the processor to periodically initiate rebuilding of the software of each server in the second server group of servers according to the second rebuild timings for the second server group. The rebuilding of the first server group of servers is staggered in time from the rebuilding of the second server group of servers.

In one embodiment, a method of rolling security for a system that includes multiple server groups is disclosed. The method includes repeatedly initiating rebuilding of the first server group of one or more servers. The method also includes repeatedly initiating rebuilding of the second server group of one or more servers. The rebuilding of the first server group of one or more servers is staggered in time from the rebuilding of the second server group of one or more servers.

In one embodiment, each of the servers in the first and second group include software that is rebuilt repeatedly, such as on a periodic basis. The software that is rebuilt can include an operating system, application, and other software. In one embodiment, each of the servers in the first and second server group includes a respective firmware. Repeatedly initiating rebuilding of the first server group comprises initiating a rebuilding of the respective firmware in each server of the first server group. Repeatedly initiating rebuilding of the second server group comprises initiating a rebuilding of the respective firmware in each server of the second server group.

In one embodiment, each of the servers in the first and second server group includes a respective password. The method also comprises repeatedly initiating a password change of each server in the first server group when rebuilding the first server group; and repeatedly initiating a password change of each server in the second server group when rebuilding the second server group.

In one embodiment, the method comprises accessing rolling timing information indicating rebuild timings for rebuilding the first server group and second server group. The first server group and the second server group are repeatedly rebuilt according to the rolling timing information. Additionally, each of the servers in the first server group and the second server group host respective applications and support user sessions for the applications, and the method further comprises monitoring durations of the user sessions for the respective applications; and generating the rolling timing information indicating rebuild timings for the first server group and the second server group based on the monitored durations of the user sessions.

In one embodiment, the servers in the first server group and the second server group that are repeatedly rebuilt are physical servers. In one embodiment, the servers in the first server group and the second server group that are repeatedly rebuilt are virtual machines.

In one embodiment, the system further comprises one or more load balancers to balance network traffic between the first server group and the second server group. The method also comprises repeatedly initiating shutdown preparation mode of the first server group prior to each rebuilding of the first server group, the load balancers preventing new sessions from being established with applications of the first server group while the first server group is in shutdown preparation mode. The method also comprises repeatedly initiating shutdown preparation mode of the second server group prior to each rebuilding of the second server group, the load balancers preventing new sessions from being established with applications of the second server group while the second server group is in shutdown preparation mode.

Other embodiments include a non-transitory computer readable medium storing instructions. The instructions are executable by at least one processor to cause the at least one processor to perform the method of rolling security. Other embodiments may apply rolling security to software containers. Other embodiments may apply rolling security to networked computing devices within a datacenter, or computing devices outside of a datacenter.

DETAILED DESCRIPTION

Figure 1A:
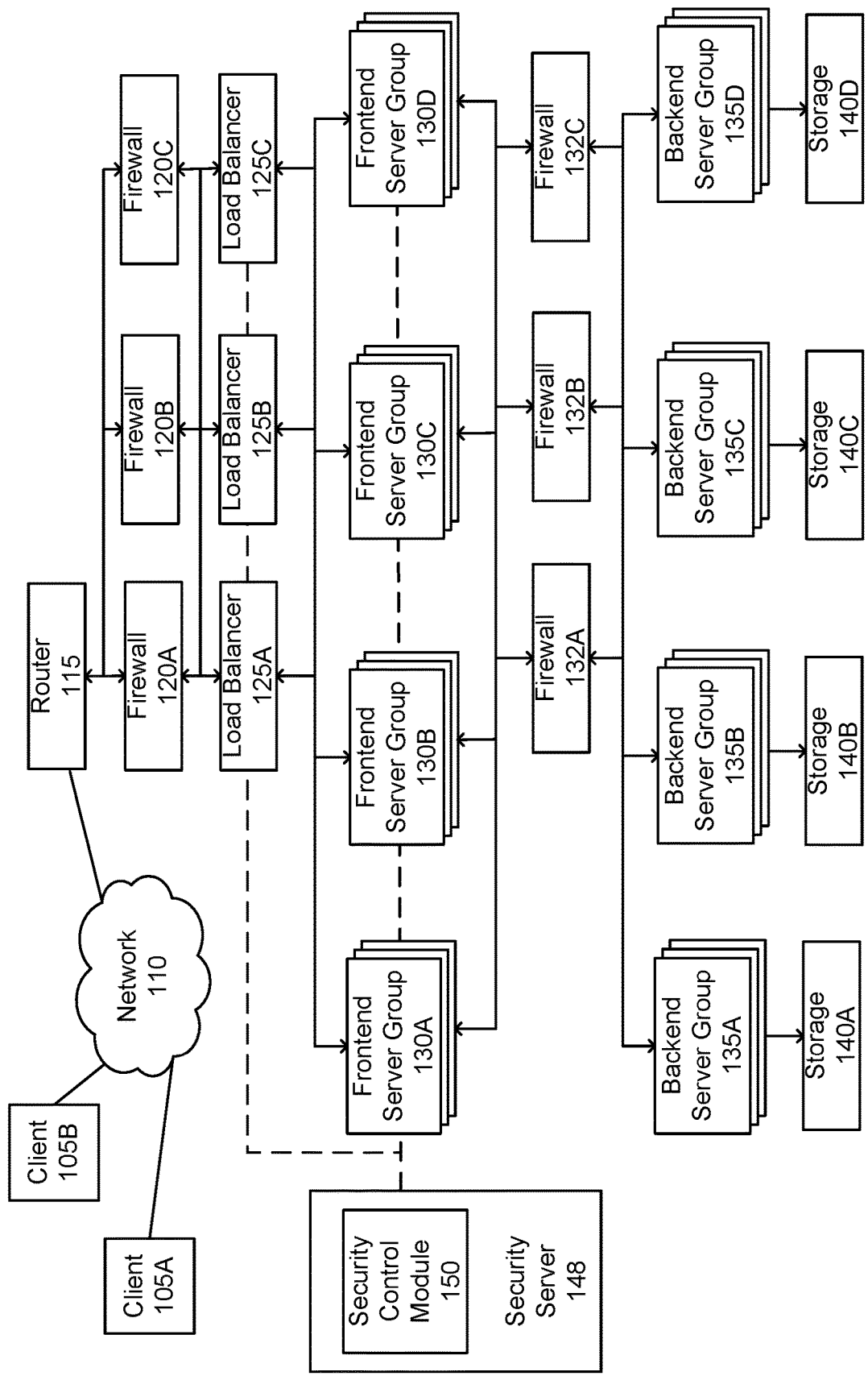
FIG. 1A is a block diagram of networked communication system with components of a secured datacenter for rolling security, according to an embodiment.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

The present disclosure relates to a system platform that prevents hackers from gaining access to backend datasets and prevents ongoing access to any dataset. More particularly, this invention can stop escalating access to unauthorized resources for a higher security solution.

In one embodiment, a security platform for a datacenter is disclosed. The security platform continually and repeatedly rebuilds itself in a rolling manner based on specific metrics of time. The rolling security will automatically replace server software in short periods of time to completely wipe out any configuration or holes found in operating systems or applications, thereby limiting access to any server to a short period of time. For example, this time can be as short as 10 seconds or as long as hours. In one embodiment, a standard configuration will default to 10 min between rebuilds. Hackers will have such a short window in which to learn the hack, figure out what the architecture is in the backend, compromise the server and try to install a root kit for further access. Thus, it is pointless for the hackers to attempt to complete their hack as the replacement of the server happens so often. By the time a hacker discovers a password or public key infrastructure (PKI) key, the operating system (OS) is being replaced along with new passwords and keys.

The system can, but is not limited to, replace the whole software stack on a device including the OS, applications, content, data and cache within a short period of time. The system can be fully integrated with multiple devices in a network (e.g. load balancer, firewalls, etc) to seamlessly manage both real users and hacker users. In other embodiments, session count, connection count, unique sensor triggers and other security indications can be used to trigger rebuilds. In other embodiments, a session can be dynamically contained into an isolated environment and a time of the session can extended to learn the hacks being performed in an isolated environment.

The system can dynamically learn the applications average session counter and time and adjust the rebuild timing dynamically or have a manual configuration to enable tighter security policies. The system limits the time any single session can be connected to a front end application and dataset to prevent long term remote access to any system.

FIG. 1A is a block diagram of networked communication system with components of a secured datacenter for rolling security, according to an embodiment. The system includes several client devices 105, a network 110, a router 115, frontend firewalls 120A-C, load balancers 125A-C, frontend server groups 130A-130D, backend firewalls or load balancers 132A-C, backend server groups 135A-135D, storage systems 140A-140D and security server 148. Routers, firewalls 120, load balancer 125, frontend servers 130, firewall 132, backend server 135, and storage systems 140 may be components of a datacenter. Only a limited number of devices are shown in FIG. 1A, but in other embodiments there may be a larger number of devices (e.g. >four frontend server groups).

Client devices 105 can be computing devices, such as smartphones, tablet computers, laptop computers, and desktop computers, among others. A user interacts with software of the client devices 105 through an interface, such as a touchscreen or mouse and keyboard. The client devices 105 are controlled by the user to establish application sessions and connections with various applications hosted by the frontend server groups 130.

The router 115 routes network traffic between the network 110 and the rest of the components in the datacenter. The frontend firewalls 120 are hardware based firewall devices that control incoming and outgoing network traffic using an applied rule set. A firewall establishes a barrier between the internal network of the datacenter and the external network 110. The load balancers 125 distribute network traffic across a large number of frontend server groups 130. The load balancers increase capacity and reliability of applications by decreasing the burden on any one particular frontend server group 130.

Each frontend server group 130 includes several physical frontend servers. A server is a server class computing device that can include one or more processors and executes an operating system. A server hosts several software applications. The clients 105 can establish networking connections and application sessions with the applications hosted by the frontend servers. For security purposes, each server group can be rolled (i.e. by rebuilding the server group) after expiration of an amount of time and the server groups can be rolled in staggered manner. Copies of the same application are hosted by multiple server groups 130 so that, even as the server groups are rolled, the application is still available to the client devices 105. In one embodiment there are a total of nine frontend server groups 130 and each frontend server group 130 includes thousands of frontend servers.

The backend firewalls 132 are hardware based firewall devices, or virtual firewalls, that control traffic between the frontend server groups 130 and backend server groups 135 using an applied rule set. Each backend server group 135 includes one or more backend servers. Backend servers permit access to the data stored in the storage systems 140. Backend servers store and retrieve data from the storage systems 140 as requested by the applications hosted by the frontend servers groups 130. An example of a backend server is a SQL server that provides access to a SQL database.

Security server 148 includes a security control module 150 that coordinates rolling operation of the frontend server groups 130. Specifically, the security control module 150 repeatedly initiates rebuilds of the frontend server groups 130 at periodic and staggered intervals. Rebuilding a server can include replacing the entire software stack of a server, including the operating system (OS), applications, content, data and caches by replacing a hard drive image of the server with a known good replacement image. Rebuilding a server can also include replacing the firmware of a server. Rebuilding may also include other operations in addition to these operations. The time between rebuilds can be as short as 10 seconds or as long as hours. In other embodiments the standard rebuild time will default to 10 min.

Repeatedly rebuilding servers on a periodic and frequent basis forces hackers to complete their hack in a short amount of time (e.g. under 5 seconds) which is near impossible as response times and upload times usually require a greater amount of time. For example, for a DNS server, the DNS server can be rebuilt every 10 seconds with a new OS and DNS database cache. In this situation, hackers will not have time to hack the protocol and upload bogus data by cache spoofing. Any malicious code uploaded by the hackers will also be eliminated. Everything tied to the server will be replaced, making it impossible to remote into the OS from outside. At the same time, all the content needed for standard customer requests are served correctly. This completely solves any holes found in today's software.

The security control module 150 also initiates the rebuilds on a rolling basis by staggering the rebuilding of each frontend server group (e.g. 130A) in time relative to the other frontend server groups (e.g. 130B). Each frontend server group 130 will start servicing user sessions at different times creating a staggering approach to when a server group 130 will come online and start serving traffic. The process from which a session starts and ends all happens within a single server or group of servers 130. This allows for simple load balancing within the group but also allows for termination of a session to happen within the group. The servers within a server group 130 will replace their OS at the same time while other server groups 130 are just coming online and servicing the new user sessions. The timeframe to rebuild a server group 130 can vary depending on the functionality of the applications in the server groups 130.

The security control module 150 also communicates with the load balancers 125 such that the load balancers 125 are aware of the server group being shut down for new OS installs, thereby allowing the load balancers 125 to distribute network traffic only to server groups 130 that are online. The security control module 150 can transmit information to the load balancers 125 to indicate when a server group 130 is beginning preparation for shutting down. In response, the load balancers 125 take the server group 130 offline and prevent new connections from being established with the server group 130. Once the server group 130 is rebuilt, the security control module 150 can transmit information to the load balancers 125 indicating that the server group 130 is ready to accept new connections. In response, the load balancers 125 put the server group 130 back online and allows new connections to be established with the server group 130

The security control module 150 can also change the password of the server groups 130 when rebuilding the server groups 130. Frequent password changes make it impossible to do password attacks on servers.

The security control module 150 can be implemented as software, hardware, or as a combination of hardware and software. In other embodiments, the security control module 150 can be distributed across one or more components of the datacenter other than the security server 148.

Figure 1B:
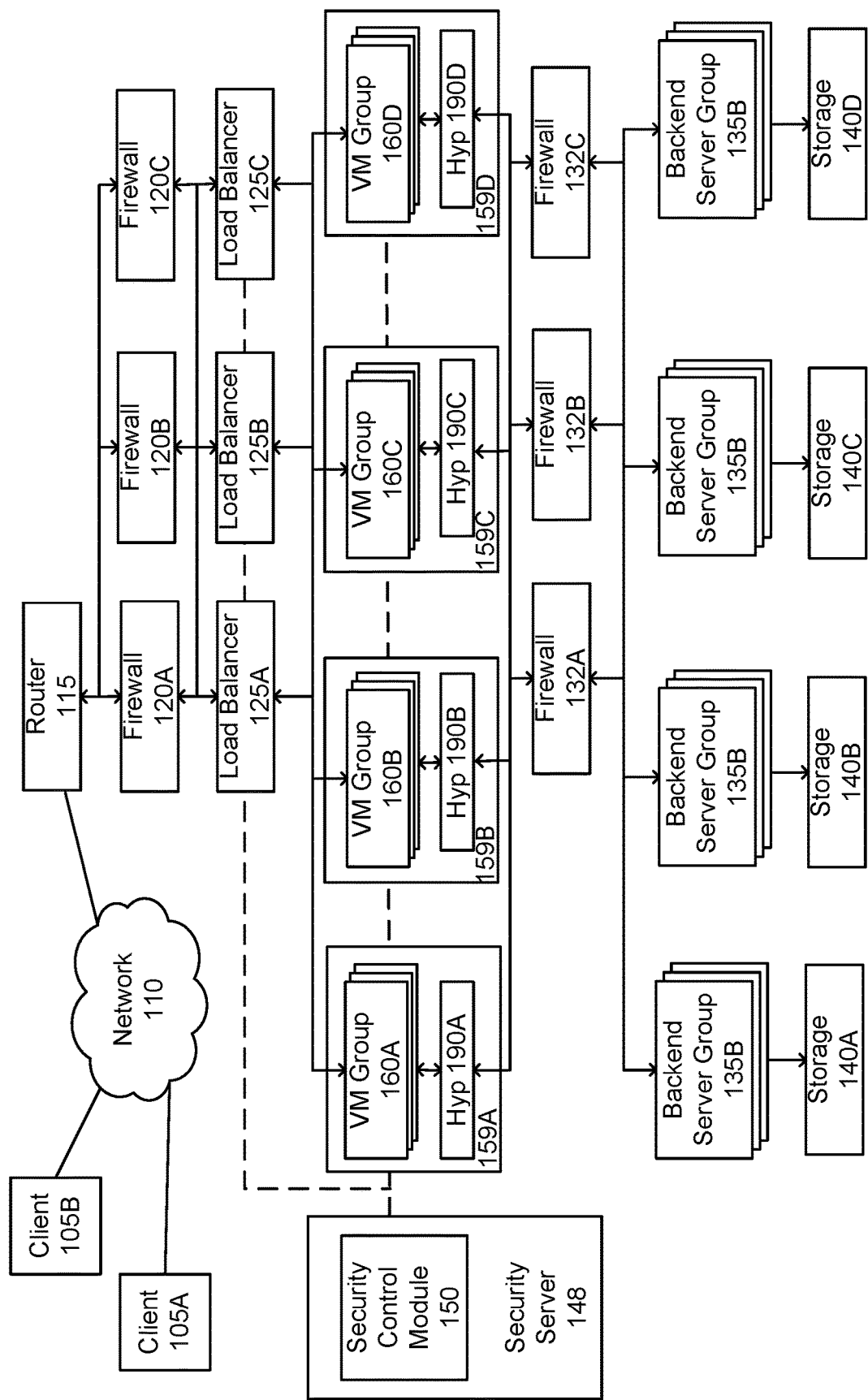
FIG. 1B is a block diagram of networked communication system with components of a secured datacenter for rolling security, according to another embodiment.

FIG. 1B is a block diagram of networked communication system with components of a secured datacenter for rolling security, according to another embodiment. FIG. 1B is similar to FIG. 1A except that it now includes frontend virtual machine (VM) groups 160 and hypervisors 190. Each VM group 160 includes one or more VMs. A VM is an emulation of a computer system, such as an emulation of a computer server. Each VM may be attached to its own virtual disk. A VM may be referred to herein as a virtual server.

Hypervisor 190 creates and manages the VMs groups 160. Each hypervisor 190 may be located on its own physical front end server 159, and also control a group of VMs 160 that are located on the same physical front end server. For example, Hypervisor 190A and VM group 160A are located on a single physical server 159A.

In this embodiment, the security control module 150 provides rolling security to the networked communication system by periodically initiating rebuilds of the frontend VM groups 160 (i.e. virtual server groups). Copies of the same application are hosted by multiple VM groups 160 so that the application is always online even as the VM groups 160 are being rebuilt. Rebuilding a VM can include restoring the state of a VM to an original known good state. Rebuilding will be explained in greater detail below.

Otherwise the operation of the security control module 150 is the same as that described in conjunction with FIG. 1A. In one embodiment, the networked communication system may include both physical server groups and virtual server groups that are rebuilt on a periodic and staggered basis.

Figure 1C:
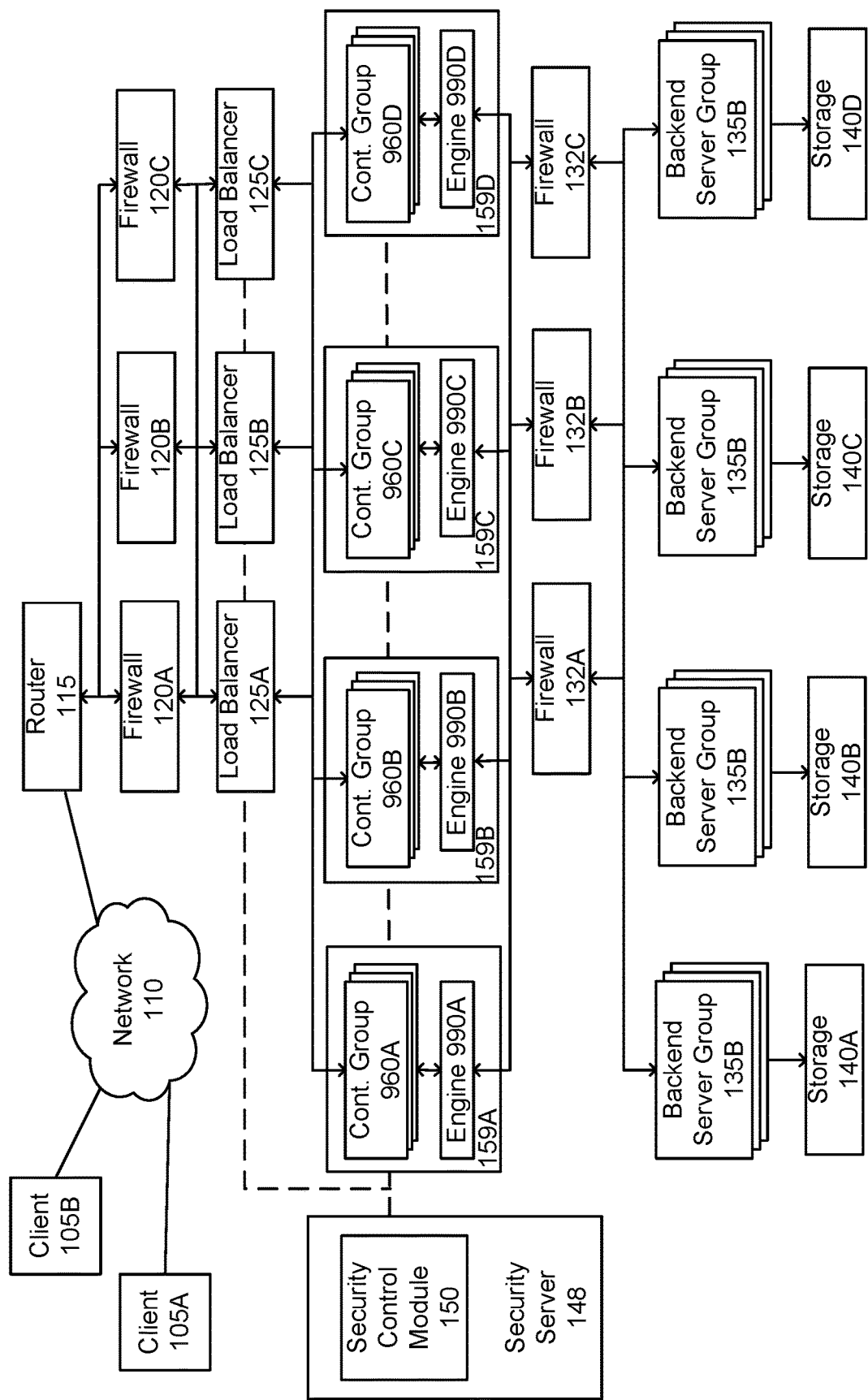
FIG. 1C is a block diagram of networked communication system with components of a secured datacenter for rolling security, according to a further embodiment.

FIG. 1C is a block diagram of networked communication system with components of a secured datacenter for rolling security, according to a further embodiment. FIG. 1C is similar to FIG. 1B except that it now includes container groups 960 and container engines 990 located on the servers 159.

Each container group 960 includes one or more software containers used for operating system level virtualization. A software container includes an application, its dependencies, libraries and binaries bundled into a single package. A software container shares an operating system (not shown) with other software containers on the same server 159. A software container is instantiated within the kernel of the operation system and virtualizes the instance of the application. Software containers allow for rapid creation of an application or service to be put into a block of resources. The deployment of a container is fast because containers can share core library files from the core OS. The software containers are managed by a container engine 990. In one embodiment, the software containers 960 are DOCKER containers or are compliant with the open container project standard.

In this embodiment, the security control module 150 provides rolling security to the networked communication system by periodically initiating rebuilds of the container groups 960 on a rolling basis. Copies of the same application are included in multiple container groups 960 so that the application is always online even as some of the container groups 960 are being rebuilt. A container can be rebuilt by restoring the container to a known good state. Rebuilding will be explained in greater detail below.

Otherwise the operation of the security control module 150 is the same as that described in conjunction with FIGS. 1A and 1B. In one embodiment, rebuilding containers can be more efficient than rebuilding physical servers and virtual machines. For example, containers can be restored and deployed in ~30 seconds. By contrast, rebuilding servers and virtual machines can take much longer. Although rolling containers can be easier than rolling physical servers and VMs, they have higher risks due to the use of shared core OS files. Hypervisor architectures also have risk, but because the OS is dedicated to each VM, it reduces the risk compared to a container platform. The risk is lower again when rolling physical servers as a hacker will need to have BIOS level control of a server to do server hijacking, or the hacker will need remote management tools access.

The description herein may primarily focus on the rolling of physical servers or virtual machines. However, the principles of rolling security described herein are applicable to rolling of physical servers, virtual machines, or containers.

Figure 2A:
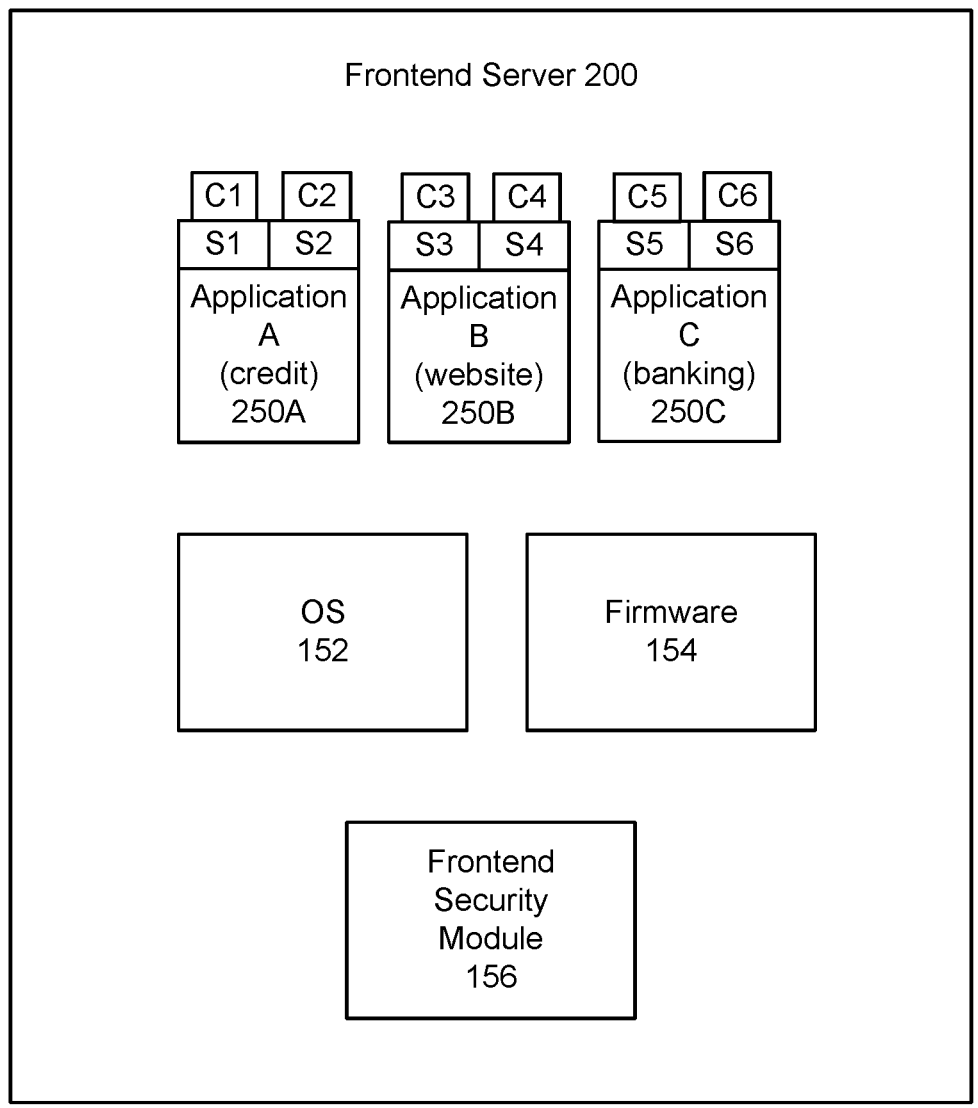
FIG. 2A is a block diagram of a frontend server from FIG. 1A, according to an embodiment.

FIG. 2A is a block diagram of a frontend server 200, according to an embodiment. Frontend server 200 may represent a frontend server from the frontend server groups 130 of FIG. 1A. Frontend server 200 includes several software applications 250A-C, an OS 152, firmware 154 and a frontend security module 156. Examples of OS 152 include LINUX and MICROSOFT WINDOWS, among others. The applications 250 are executed on top of the OS 152. The firmware 154 includes software that is stored in a programmable memory chip.

The client devices 105 can establish networking connections C1-C6 with the applications 250. A connection is used as a bidirectional communication channel between sockets at the client devices 105 and the server 200. The connection is established at a certain point in time using a handshake process, and then terminated at a later point in time. The connection may include several states defined by a protocol. An example of a connection is a transmission control protocol (TCP) connection of the transport layer of the Open Systems Interconnect (OSI) model.

The client devices 105 also establish application user sessions S1-S6 with the applications 250 over the connections C1-C6. A user session is an interactive information exchange between two or more communicating entities for a given application. The user session is established at a certain point in time, and then terminated at a later point in time. During the user session, one or more messages may be sent in each direction over a connection that has been established for the session. In one embodiment, the application sessions are sessions of the OSI session layer that sit above the transport layer.

In one example, a credit card authentication session (e.g. S1, S2) can be initiated when a user swipes a credit card at a client device 105A, and the client device 105A establishes a connection and session with credit card payment application 250A. Credit card payment application 250A communicates with the client device 105A to obtain the credit card number and charge amount from the client device 105A. The credit card payment application 250 then accesses the database 140 via backend server 135 to determine if the credit card number has sufficient credit to process the payment. The credit card payment application 250 then provides a yes/no response to the client device 105A. The connection and session are then terminated after providing the response to the client device 105A.

In another example, a web form session (e.g. S3, S4) can be initiated when a user enters a URL into a browser at a client 105B. The client device 105B establishes a session with website 250B. The server 200 may be processing multiple sessions. The server 200 starts a time counter per session. The user has x amount of time to fill out a form before the session closes. A different server may process the form submission from the initial session due to the time it takes to fill out the web form data.

In a further example, an online banking session (e.g. S5, S6) can be initiated when a user opens a mobile banking application at the client device 105B, and the client device 105B establishes a connection and session with online banking application 250C. Online banking application 250C communicates with the client device 105B to obtain authentication information from the client device 105B. Once authenticated, the client device 105B can request account balances, upload copies of checks for deposit, and make other banking requests. The banking application 250C can access account information stored in database 140 via backend server 135 to process these requests. The connection and session are eventually terminated at the end of the session.

Frontend security module 156 can communicate with the security control module 150 to send and receive security information to implement rolling security. The security module 156 can receive commands to initiate a rebuild of the frontend server 200. The commands can include a name of a golden image, which is a known good master software image that is to be used as a template for the rebuild. The security module 156 then rebuilds the frontend server 200 in accordance with the commands, such as by replacing the OS 152, applications and/or firmware 154. The OS 152, applications 250 and/or firmware 154 can replaced by overwriting existing software on the server 200 with the golden image, deleting existing software on the server 200 and copying new software onto the server 200 from the golden image, etc. The golden image can be stored locally on a disc within the server 200 or elsewhere on a network.

Different rebuild techniques with varying rebuild times can be used. In one embodiment, a single golden image can be used to rebuild multiple servers 200. Data from the golden image can be copied onto the frontend server 200, and then post process configurations are executed on each frontend server 200 to configure the OS 152 or applications 250. For example, a different script may be executed on each frontend server 200 to establish a unique name for the server and an IP address for the server. In one embodiment, there may be multiple golden images that are specific and unique to each frontend server 200. The data from a golden image can be copied onto a respective server without the need for post process configurations, which reduces rebuild time.

In another embodiment, a data differencing technique is used to rebuild the frontend server 200. Specifically, data blocks or files of the software of a frontend server 200 can be compared to data blocks or files of a golden image. Only the data blocks or files that are different are restored from the golden image. By leveraging block or file based differencing, rapid deployment of preconfigured OS and app configurations via local disk, remote SAN disks or NAS disks is possible. It should be noted that other rebuild techniques may be possible and still fall within the scope of the disclosure.

In one embodiment, various hash or encryption models or block state comparisons can be applied to a rebuilt software image to verify the rebuild is of standard expected configuration and the state is of a good known configuration. For example, the rebuilt software can be hashed and then compared to the hash of the golden image to verify that the rebuild was performed as expected.

In one embodiment, the frontend security module 156 places a frontend server 200 into a lock down security mode during rebuilds for protection against tampering. During rebuilds, the frontend security module 156 may set its internal firewall access control lists (ACL) with permissions that block any traffic to certain ports other than communications with the security control module 150 of the security server 148. An ACL can be a list of network ports, along with specific entities permitted to use the network ports. Other 3$^{rd}$ party applications may also be given access on a need basis for verification of state of compliance.

The security module 156 can also receive a command to change the password of the OS 152 and then replace the password in accordance with the command. In one embodiment, the security information is communicated via an intelligent platform management interface (IPMI).

Figure 2B:
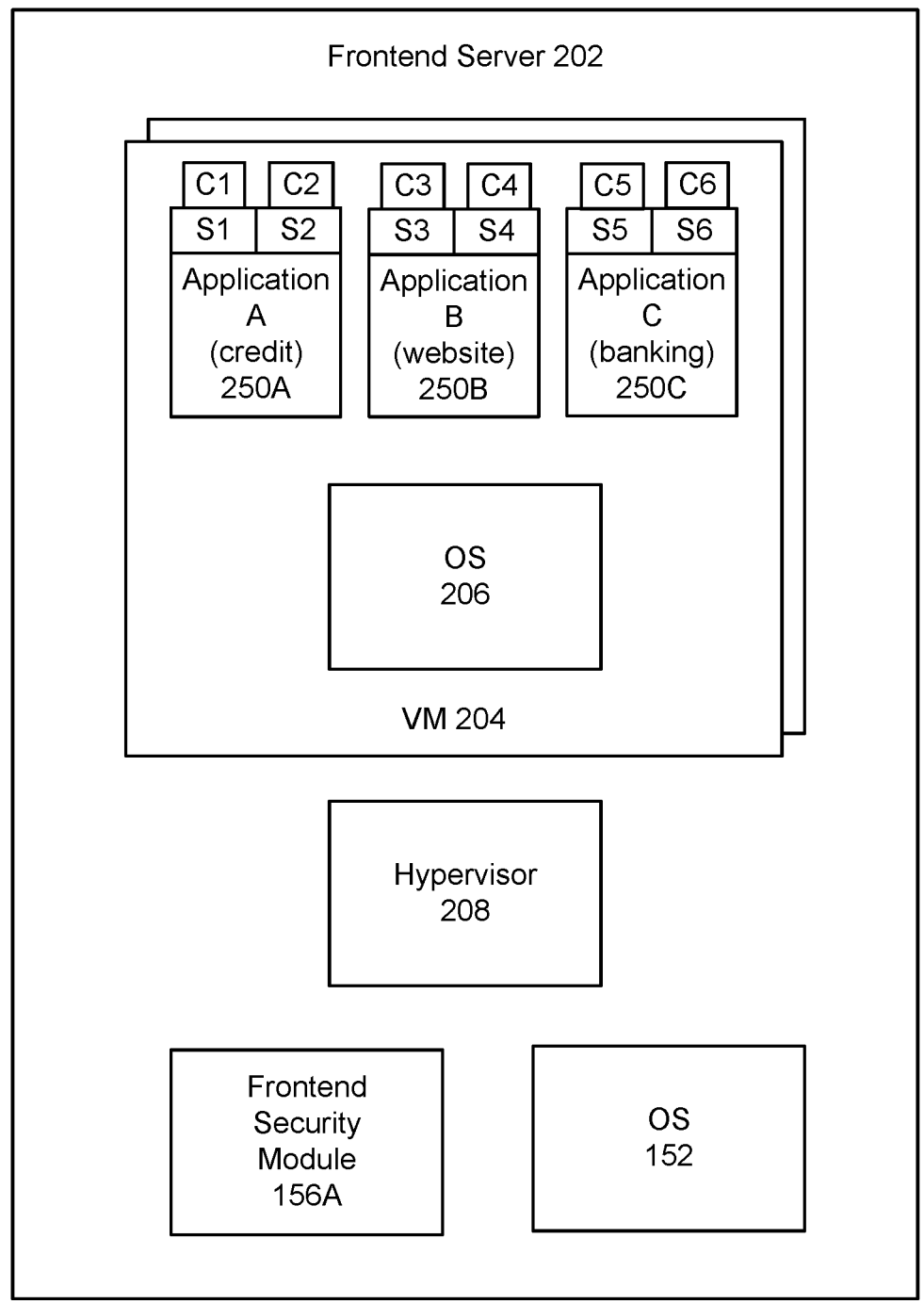
FIG. 2B is a block diagram of a server with virtual machines, according to an embodiment.

FIG. 2B is a block diagram of a frontend server 202 with VMs 204, according to an embodiment. Frontend server 202 may represent a frontend server 159 from FIG. 1B. Frontend server 202 includes several VMs 204, hypervisor 208, OS 152, and frontend security module 156A. Each VM includes a virtualized OS 206 and applications 250.

Frontend security module 156A is similar to frontend module 156, but now rebuilds VMs in response to commands to rebuild the VMs 204. The rebuilding of VMs 204 is similar to the rebuilding described with respect to FIG. 2A, and can also utilize a golden image of a VM 204 to generate a VM 204, utilize data differencing, and/or perform rebuild verification after rebuilding the VM 204.

Figure 2C:
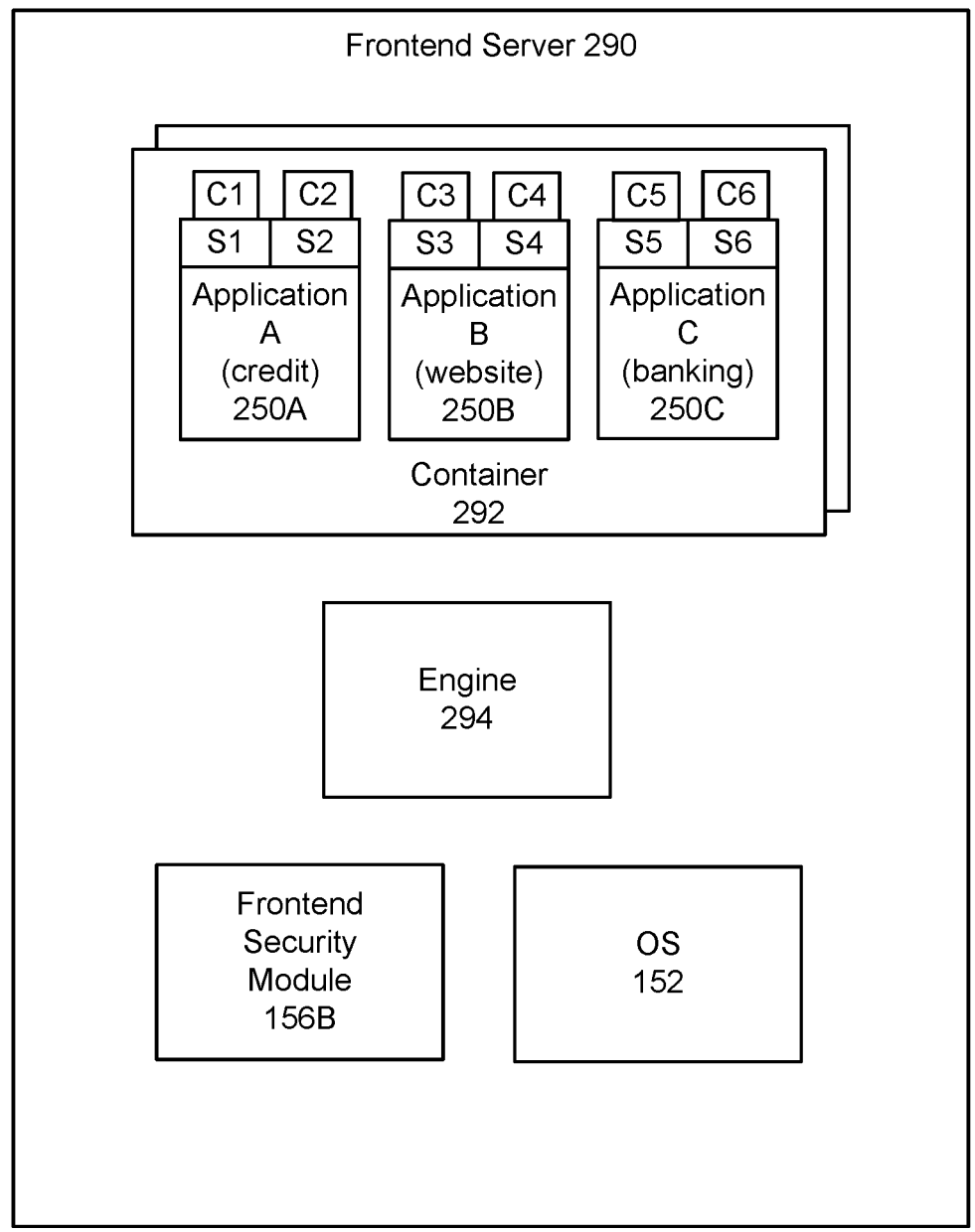
FIG. 2C is a block diagram of a server with software containers, according to an embodiment.

FIG. 2C is a block diagram of a frontend server 290 with containers 292, according to an embodiment. Frontend server 290 may represent a frontend server 159 from FIG. 1C. Frontend server 290 includes several containers 292, container engine 294, OS 152, and frontend security module 156B. Each container includes virtualized applications 250.

Frontend security module 156B is similar to frontend module 156, but now rebuilds containers 292 on a rolling basis in response to commands to rebuild the containers 292. The rebuilding of containers 292 is similar to the rebuilding described with respect to FIG. 2A, and can also utilize a golden image of a container 292 to generate a container 292, utilize data differencing, and/or perform rebuild verification after rebuilding the container 292.

Figure 3:
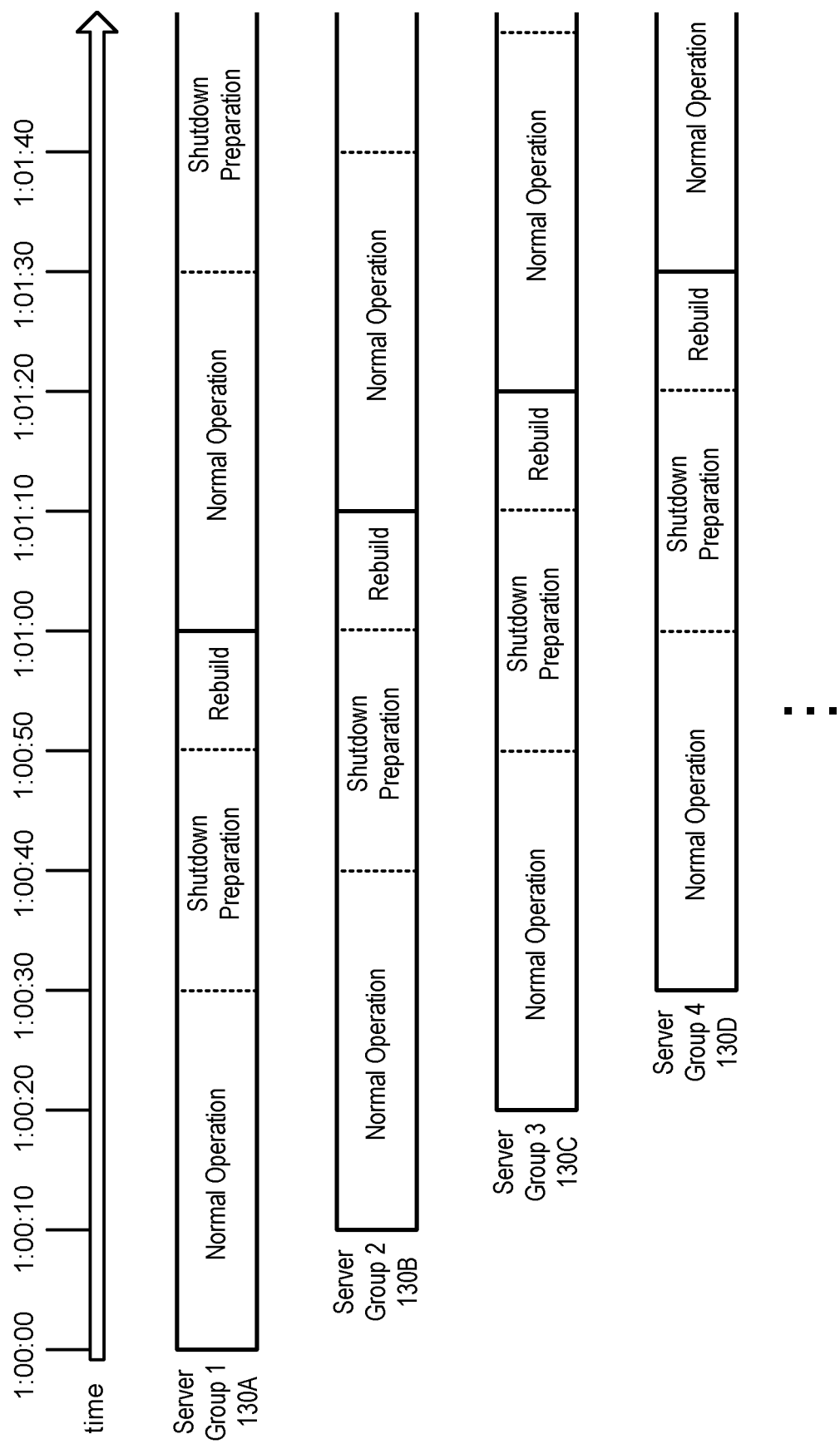
FIG. 3 is a diagram of rolling server groups, according to an embodiment.

FIG. 3 is a diagram of rolling server groups, according to an embodiment. The rolling operation of four server groups 130A-130D is illustrated in FIG. 3. In other embodiments, the rolling operation shown in FIG. 3 is also applicable to rolling of VM groups 160 and software container groups 960.

Each server group 130 operates in different rolling security modes: (1) a normal operation mode (2) a shutdown preparation mode and (3) a rebuilding mode. During the normal operation mode a server group 130 accepts and services new user sessions and connections. During the shutdown preparation mode the server group 130 does not accept new sessions and connections. Existing sessions and connections are allowed to finish. In one embodiment, the load balancers 125 may be notified that a particular server group 130 is being placed into shutdown preparation mode and is not accepting new sessions and connections. The load balancers 125 respond by removing the server group 130 from the possible server groups 130 to which new sessions and connections can be made. During the rebuilding mode the server group 130 is removed from service and is rebuilt by replacing the software of the server group 130. The modes repeat periodically, such as every 60 seconds.

The server groups 130 are operated in a rolling manner such that the rebuilding of different server groups is initiated at different times. For example, server group 130A is rebuilt at 1:00:50, server group 130B is rebuilt at 1:01:00, server group 130C is rebuilt at 1:01:10, and server group 130D is rebuilt at 1:01:20. The rebuild times are staggered from each other by ten seconds. The staggering of rebuild times ensures that there is always at least one server group 130 in service and available to accept new connections and user sessions for applications hosted by the server group 130. In other words, there is always at least one server group 130 that is in normal operation mode.

In one embodiment, shutdown preparation mode may be delayed for a server group 130 if a security condition indicating the presence of a hacker is triggered. A security condition may be triggered, for example, if session is associated with a suspicious IP or has kept the session open for too long. In that situation, the security control module 150 may implement deep analytics of the session, containment of the session and recording of the session to better understand a hacker's actions. Alternatively, if a security condition is triggered, the security module 150 may take a hacked server, on which hacked session is detected, out of a server group 130. A new server is then hot swapped in place of the hacked server such that the rolling of the server groups 130 is not interrupted.

Figure 4:
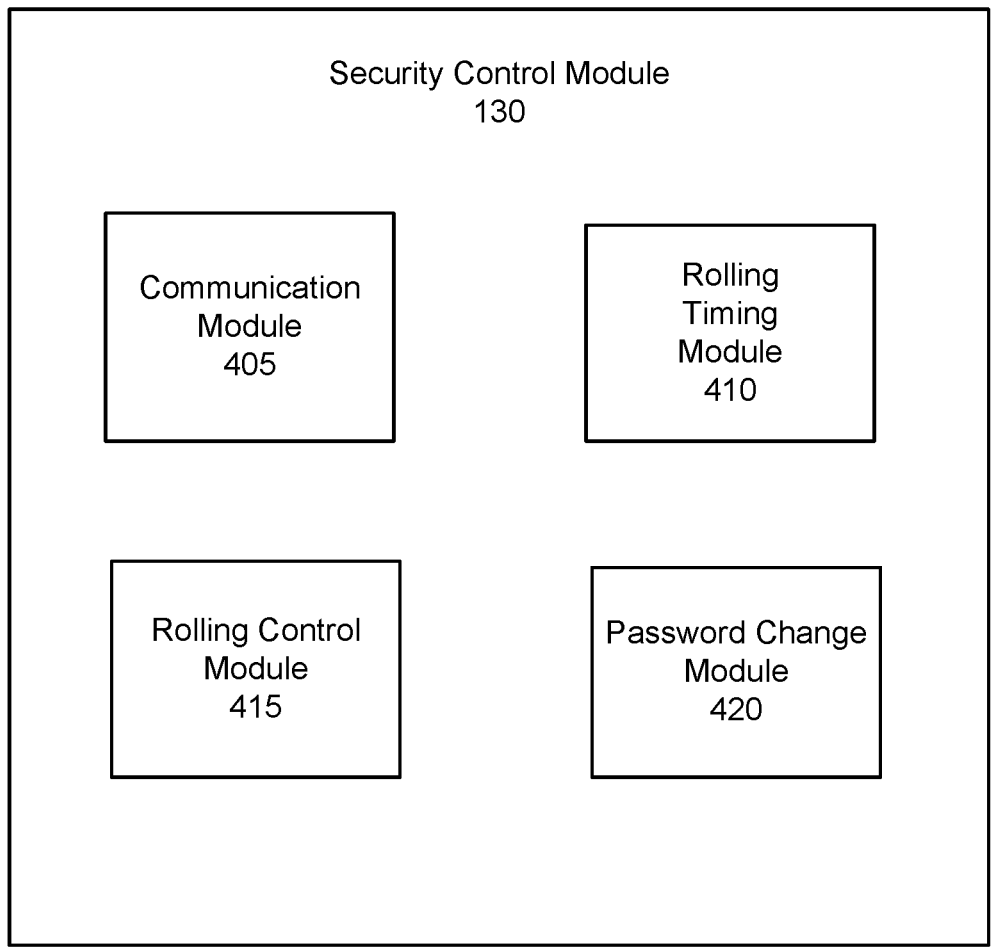
FIG. 4 is a block diagram of a security control module, according to an embodiment.

FIG. 4 is a block diagram of a security control module 130, according to an embodiment. Security control module 130 includes a communication module 405, rolling timing module 410, rolling control module 415, and password change module 420. In other embodiments the security control module 130 may have additional modules not shown in FIG. 4.

The rolling timing module 410 maintains rolling timing information indicating staggered timings for when the physical server groups 130, VM groups 160, or container groups 960 (collectively referred to herein as "rolling entity groups") should enter different modes, such as normal operation mode, shutdown preparation mode and rebuilding mode. The timing information may be in the form of a timing schedule that includes a list of rolling entity groups and specific times for when each rolling entity group should enter different modes. The following table is an example of a timing schedule.

| Server Group | Mode: Normal Operation | Mode: Shutdown Preparation | Mode: Rebuilding |
|---|---|---|---|
| 1 | 1:00:00 | 1:00:30 | 1:00:50 |
|   | 1:01:00 | 1:01:30 | 1:01:50 |
|   | . . . | . . . | . . . |
| 2 | 1:00:10 | 1:00:40 | 1:01:00 |
|   | 1:01:10 | 1:01:40 | 1:02:00 |
|   | . . . | . . . | . . . |
| 3 | 1:00:20 | 1:00:50 | 1:01:10 |
|   | 1:01:20 | 1:01:50 | 1:02:10 |
|   | . . . | . . . | . . . |
| 4 | 1:00:30 | 1:01:00 | 1:01:20 |
|   | 1:01:30 | 1:02:00 | 1:02:20 |
|   | . . . | . . . | . . . |

The first column of the table identifies a server group. The second column identifies start times for when the server group should enter the normal operation mode. The third column identifies when the server group should enter shutdown preparation mode. The fourth column identifies when the rebuilding process should begin.

In other embodiments, the timing information may be in the form of maximum time limits instead of a timing schedule. For example, the timing information may include a maximum uptime of a rolling entity group, a maximum duration of a normal operation mode, a maximum duration of a shutdown preparation mode, and/or a maximum duration of a rebuild mode. The timing information may also include information describing an amount of staggered delay between the rolling entity groups.

The rolling timing information for the rolling modes may be manually set by a user. In another embodiment, the timing information may be machine learned by monitoring the durations of previous application sessions or connections on the servers and generating application profiles that include the monitored durations. A statistical measure of the durations (e.g. average duration, maximum duration) can be determined from the monitored durations. The statistical measure is then multiplied by a multiplier (e.g. 8×, 10×) to determine the maximum duration of each rolling mode. The result is that the time between rebuilds is sufficient for new user sessions and connections to be established and completed before a rolling entity group is rebuilt. For example, if user sessions tend to be 6 seconds long, this value may be multiplied by 8× to result in a duration between periodic rebuilds of 48 seconds, which is much greater than the session duration.

Rolling control module 415 controls the rolling operation of the rolling entity groups in accordance with the rolling timing information, such as the rolling timing schedule or the maximum time limits described above. The rolling control module 415 uses the rolling timing information to determine the rolling mode that a server group should be in. The rolling control module 415 then sends control commands to the load balancers 125 and rolling entity groups via the communication module 405 that cause the rolling entity groups to operate in a rolling manner as shown in FIG. 3. The commands for each rolling entity group may be staggered in time relative to commands for the other rolling entity groups to ensure that the rolling entity groups are rolled at controlled and staggered times.

To initiate normal operation mode, the rolling control module 415 may transmit a normal operation initiation command to the load balancers 125. The command identifies a particular rolling entity group and also indicates that normal operation mode is to begin for that rolling entity group. The load balancer 125 responds to the command by allowing sessions and connections to be established with the identified rolling entity group. In one embodiment the normal operation initiation command may also be transmitted to the appropriate rolling entity group for which normal operation is being initiated.

To initiate shutdown preparation mode, the rolling control module 415 may transmit a shutdown preparation initiation command to the load balancers 125. The command identifies a particular rolling entity group and also indicates that shutdown preparation mode is to begin for that rolling entity group. The load balancer 125 responds to the command by preventing any new sessions and connections to be established with the identified rolling entity group. Existing sessions and connections of the rolling entity group are permitted to complete. In one embodiment the shutdown preparation initiation command may also be transmitted to the appropriate servers for a rolling entity group.

To initiate rebuilding, the rolling control module 415 may send a rebuild initiation command to the appropriate front end server(s) associated with a rolling entity group that is to be rebuilt. The command can include a name of a known good software image that is to be used for the rebuild. In response, the rolling entity group can be rebuilt with the known good software image. The rolling control module 415 may also receive rebuild confirmation information from the appropriate front end servers once the rebuild is completed.

Additionally, prior to rebuilding, rolling control module 415 can copy data from a rolling entity group to a separate storage drive. Machine learning can be used to monitor for changes in the data and do an inline analysis of the changes for global comparison across other servers. This allows for understanding of all the changes made by a hacker to the OS, applications, or files while an entity was online. Machine learning the rebuild state and timing is important but delaying the rebuild state over a hacked situation to enable more advanced learning is also part of the system controls managed via the rolling control module 415. Rolling control module 415 can also communicate with the local server groups, router 115 and firewall 120 to continue servicing a hacker with the intention of learning and collection more data to learn the hackers capabilities and learn more about new attacks.

Password change module 420 initiates password changes for the server groups 130. The passwords can be OS, database, or application passwords, among others. The passwords can be changed with every rebuild as indicated by the rolling timing information, or can be rebuilt at specific timestamps (i.e. at certain intervals). The frequency of the password changes can be the same as or different than the frequency of the rolling entity group rebuilds. In one embodiment, the password change module 420 can initiate a password change by generating new passwords and transmitting the passwords to the servers. In another embodiment, the password change module 420 can initiate a password change by sending a password change command to the servers. The servers then generate new passwords in response to the command. Any of a number of algorithms can be used to generate the password. In one embodiment, a timestamp is one of the elements used to generate the password.

Communication module 405 communicates with the servers, load balancers 125, and other devices in the networked communication system. The communication module 405 may transmit rolling security commands that cause the rolling entity groups to operate in a rolling and staggered manner. The communication module 405 may send commands that initiate password changes at the rolling entity groups. The communication module 405 may also receive other types of information from the devices in the networked communication system.

Figure 5:
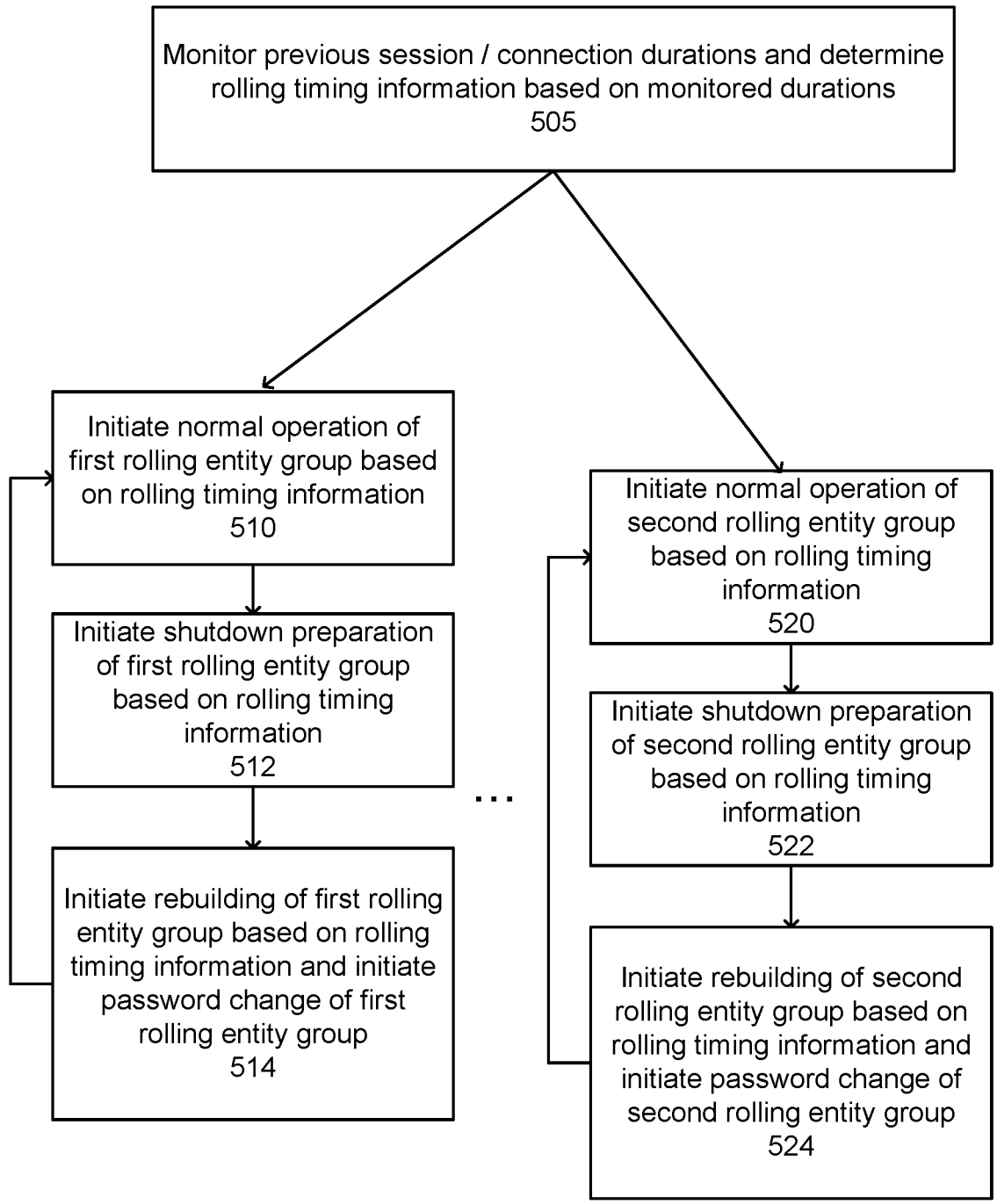
FIG. 5 is a flowchart for a method of rolling security, according to an embodiment.

FIG. 5 is a flowchart for a method of rolling security, according to an embodiment. In step 505, previous connections or user sessions for applications hosted by the rolling entity groups are monitored. The durations are stored in application profiles. Once sufficient information is collected, the durations for the previous connections and user sessions is used to generate rolling timing information that describes staggered timings for different rolling security modes of the rolling entity groups, such as staggered timing for when different rolling entity groups should be rebuilt.

In step 510, the security control module 150 initiates normal operation of the first rolling entity group at a timing specified by the rolling timing information. In step 512, the security control module 150 initiates shutdown preparation mode of the rolling entity group at a timing specified by the rolling timing information. In step 514, the security control module 150 initiates rebuilding of the first rolling entity group at a timing specified by the rolling timing information. Additionally, the security control module 150 initiates a password change of the first rolling entity group at the same time. Steps 510-514 repeat continuously, such as at periodic intervals.

In step 520, the security control module 150 initiates normal operation of the second rolling entity group at a timing specified by the rolling timing information. In step 522, the security control module 150 initiates shutdown preparation mode of the second rolling entity group at a timing specified by the rolling timing information. In step 524, the security control module 150 initiates rebuilding of the second rolling entity group at a timing specified by the rolling timing information. Additionally, the security control module 150 initiates a password change of the second rolling entity group at the same time. Steps 520-524 repeat continuously, such as at periodic intervals.

Other rolling entity groups may also be controlled in a similar manner as steps 510-514 and 520-524. Additionally, for each rolling entity group, the initiation of the rebuilding, normal operation modes, and shutdown preparation modes is staggered in time relative to the other rolling entity groups. Staggering of the security modes results in the rolling security illustrated in FIG. 3.

Figure 6:
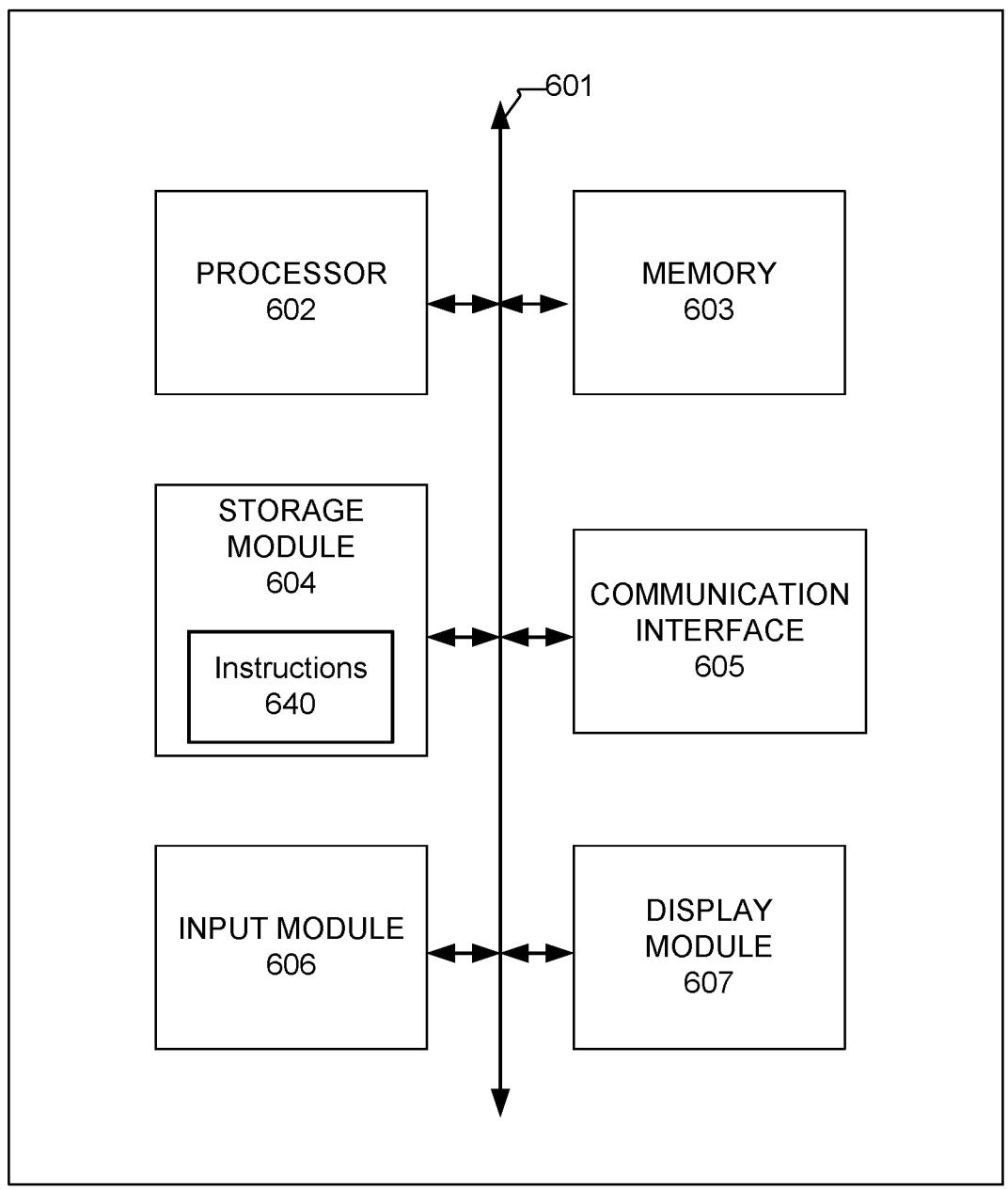
FIG. 6 illustrates the hardware architecture of a computing device.

FIG. 6 illustrates the hardware architecture of a computing device, such as a firewall 120, router 115, load balancer 125, client device 105, frontend server 130 or 159, backend server 135, or security server 148, according to one embodiment. In one embodiment, the computing device is a computer including components such as a processor 602, a memory 603, a storage module 604, an input module (e.g., keyboard, mouse, and the like) 606, a display module 607 and a communication interface 605, exchanging data and control signals with one another through a bus 601. The storage module 604 is implemented as one or more non-transitory computer readable storage media (e.g., hard disk or solid state drive), and stores software instructions 640 (e.g. modules) that are executed by the processor 602 in conjunction with the memory 603 to implement the rolling security features described herein. Operating system software and other application software may also be stored in the storage module 604 to run on the processor 602.

The rolling security described herein is not only limited to front end servers 130, virtual machines 160, and containers 960. In other embodiments the rolling security can be used to periodically rebuild other groups of computing systems in a datacenter, such as firewalls 120, load balancers 125, switches, backend servers 135 and backend storage 140. Additionally, the functions of the modules described herein may be combined into a single module or distributed across additional modules.

In other embodiments, the rolling security described herein may be applied to other groups of computing systems outside of datacenters that provide common software functionality. The computing systems can be desktops, laptops, ipads, iphones, and computing systems in vehicles (cars, trains, planes) and computing systems in power plants, generators, etc. In the example of a plane, the plane may include several parallel flight control systems, each of which can provide flight control for the plane. Rolling the flight control systems on a staggered basis can protect the flight control systems from being hacked while ensuring that at least one flight control system is always online.

Upon reading this disclosure, those of skill in the art may appreciate still additional alternative designs for rolling security. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A computer implemented method to generate rolling timing information, comprising:

monitoring, using one or more processors a first plurality of application sessions on a first server group and a second plurality of application sessions on a second server group;

determining, using the one or more processors based on monitoring the first plurality of application sessions, a first plurality of durations for the first plurality of application sessions, and, based on monitoring the second plurality of application sessions, a second plurality of durations for the second plurality of application sessions;

determining, using the one or more processors based on the first plurality of durations, a first rebuild interval for the first server group;

determining, using the one or more processors based on the second plurality of durations, a second rebuild interval for the second server group;

generating, using the one or more processors, rolling timing information indicating rebuild timings for the first server group based on the first rebuild interval and rebuild timings for the second server group based on the second rebuild interval, wherein the rebuilt timings for the first server group and the second server group are staggered; and causing the first server group to be rebuilt and the second server group to be rebuilt based on the rolling timing information.

2. The method of claim 1, wherein determining the first rebuild interval for the first server group comprises:

calculating a statistical measure based on the first plurality of durations of the first plurality of application sessions; and determining the first rebuild interval by applying a multiplier to the statistical measure.

3. The method of claim 2, wherein the statistical measure is one of an average duration and a maximum duration.

4. The method of claim 1, wherein causing the first server group to be rebuilt comprises causing the first server group to enter a shutdown preparation mode from a normal operation mode.

5. The method of claim 4, wherein generating rolling timing information comprises generating a maximum duration of the normal operation mode.

6. The method of claim 4, wherein causing the first server group to enter a shutdown preparation mode comprises transmitting a shutdown preparation initiation command to one or more load balancers, wherein the shutdown preparation initiation command comprises an identifier of the first server group.

7. The method of claim 1, wherein causing the first server group to be rebuilt and the second server group to be rebuilt comprises determining that the first server group has been rebuilt before initializing a rebuild of the second server group.

8. A non-transitory computer readable medium comprising stored instructions, the instructions when executed by one or more processors cause the one or more processors to:
monitor a first plurality of application sessions on a first server group and a second plurality of application sessions on a second server group;
determine, based on monitoring the first plurality of application sessions, a first plurality of durations for the first plurality of application sessions, and, based on monitoring the second plurality of application sessions, a second plurality of durations for the second plurality of application sessions;
determine, based on the first plurality of durations, a first rebuild interval for the first server group;
determine, based on the second plurality of durations, a second rebuild interval for the second server group;
generate rolling timing information indicating rebuild timings for the first server group based on the first rebuild interval and rebuild timings for the second server group based on the second rebuild interval, wherein the rebuilt timings for the first server group and the second server group are staggered; and
cause the first server group to be rebuilt and the second server group to be rebuilt based on the rolling timing information.

9. The non-transitory computer readable medium of claim 8, wherein the instructions that cause the one or more processors to determine the first rebuild interval for the first server group comprise further instructions to cause the one or more processors to:
calculate a statistical measure based on the first plurality of durations of the first plurality of application sessions; and
determine the first rebuild interval by applying a multiplier to the statistical measure.

10. The non-transitory computer readable medium of claim 9, wherein the statistical measure is one of an average duration and a maximum duration.

11. The non-transitory computer readable medium of claim 8, wherein the instructions that cause the one or more processors to rebuild the first server group comprise further instructions that cause the one or more processors to cause the first server group to enter the shutdown preparation mode from the normal operation mode.

12. The non-transitory computer readable medium of claim 11, wherein the instructions that cause the one or more processors to generate rolling timing information, comprise further instructions that cause the one or more processors to generate a maximum duration of the normal operation mode.

13. The non-transitory computer readable medium of claim 12, wherein the instructions to cause the first server group to enter the shutdown preparation mode, comprise further instructions that cause the one or more processors to execute a shutdown preparation initiation command to one or more load balancers, wherein the shutdown preparation initiation command comprises an identifier of the first server group.

14. The non-transitory computer readable medium of claim 8, wherein the instructions to cause the first server group to be rebuilt and the second server group to be rebuilt comprise further instructions that when executed by the one or more processors determines whether the first server group has been rebuilt before initializing a rebuild of the second server group.

15. A system to generate rolling timing information, comprising:
a first server group of servers;
a second server group of servers, each server in the first server group and second server group including software that includes an operating system and an application that supports user sessions;
one or more processors; and
a non-transitory computer readable medium storing instructions, the instructions when executed by the one or more processors cause the one or more processors to:
monitor a first plurality of application sessions on a first server group and a second plurality of application sessions on a second server group;
determine, based on monitoring the first plurality of application sessions, a first plurality of durations for the first plurality of application sessions, and, based on monitoring the second plurality of application sessions, a second plurality of durations for the second plurality of application sessions;
determine, based on the first plurality of durations, a first rebuild interval for the first server group;
determine, based on the second plurality of durations, a second rebuild interval for the second server group;
generate rolling timing information indicating rebuild timings for the first server group based on the first rebuild interval and rebuild timings for the second server group based on the second rebuild interval, wherein the rebuilt timings for the first server group and the second server group are staggered; and
cause the first server group to be rebuilt and the second server group to be rebuilt based on the rolling timing information.

16. The system of claim 15, wherein the instructions that cause the one or more processors to determine the first rebuild interval for the first server group, cause the one or more processors to:
calculate a statistical measure based on the first plurality of durations of the first plurality of application sessions; and
determine the first rebuild interval by applying a multiplier to the statistical measure.

17. The system of claim 16, wherein the statistical measure is one of an average duration and a maximum duration.

18. The system of claim 15, wherein the instructions that cause the one or more processors to rebuild the first server group, cause the one or more processors to cause the first server group to enter the shutdown preparation mode from the normal operation mode.

19. The system of claim 18, wherein generating rolling timing information comprises generating a maximum duration of the normal operation mode.

20. The system of claim 18, wherein the instructions that cause the first server group to enter a shutdown preparation mode, cause the one or more processors to transmit a shutdown preparation initiation command to one or more load balancers, wherein the shutdown preparation initiation command comprises an identifier of the first server group.

* * * * *

UNITED STATES PATENT AND TRADEMARK OFFICE
CERTIFICATE OF CORRECTION

| | |
|---|---|
| PATENT NO. | : 11,601,432 B2 |
| APPLICATION NO. | : 17/194132 |
| DATED | : March 7, 2023 |
| INVENTOR(S) | : Robert Pike |

It is certified that error appears in the above-identified patent and that said Letters Patent is hereby corrected as shown below:

On the Title Page

Item (71), in Column 1, in "Applicant", Line 1, delete "Inc." and insert -- Inc., Snohomish, WA (US) --, therefor.

In the Claims

In Column 14, in Claim 1, Line 14, delete "processors" and insert -- processors, --, therefor.

Signed and Sealed this
Seventh Day of May, 2024

Katherine Kelly Vidal
*Director of the United States Patent and Trademark Office*